United States Patent [19]

Mott

[11] Patent Number: 4,786,090
[45] Date of Patent: Nov. 22, 1988

[54] PEAKED-TOP RESILIENT SEAL RING AND CONNECTION THEREWITH

[75] Inventor: Keith C. Mott, Houston, Tex.
[73] Assignee: Hydril Company, Houston, Tex.
[21] Appl. No.: 937,683
[22] Filed: Dec. 4, 1986
[51] Int. Cl.$^4$ ............................................. F16L 15/00
[52] U.S. Cl. .................................. 285/332.3; 285/334; 285/355
[58] Field of Search .................. 285/332.3, 332.2, 231, 285/230, 355, 334, 347; 277/170, 171, 172, 207 A

[56] References Cited

U.S. PATENT DOCUMENTS

| | | | |
|---|---|---|---|
| 1,976,589 | 10/1934 | Trickey | 285/347 X |
| 2,146,641 | 2/1939 | McWane | 285/231 X |
| 2,150,221 | 3/1939 | Hinderliter | 285/332.3 |
| 2,477,533 | 7/1949 | Whiting | 277/170 |
| 3,114,566 | 12/1963 | Coberly et al. | 285/332.3 X |
| 3,508,771 | 4/1970 | Duret | 285/355 X |
| 3,592,481 | 7/1971 | Jeffery | 285/230 X |
| 3,741,570 | 6/1973 | Garrett | 285/231 X |
| 3,891,224 | 6/1975 | Ditcher | 285/230 X |
| 4,085,951 | 4/1978 | Morris | 285/355 X |
| 4,154,466 | 5/1979 | Simmons | 285/332.3 X |
| 4,458,925 | 7/1984 | Raulins | 285/355 X |
| 4,583,772 | 4/1986 | Vassallo | 285/347 |
| 4,591,195 | 5/1986 | Chelette et al. | 285/334 X |
| 4,671,544 | 6/1987 | Ortloff | 285/334 |

FOREIGN PATENT DOCUMENTS

| | | | |
|---|---|---|---|
| 269542 | 11/1964 | Australia | 277/207 A |
| 102932 | 3/1984 | European Pat. Off. | 277/207 A |
| 571178 | 12/1957 | Italy | 285/332.3 |
| 198815 | 10/1965 | Sweden | 285/231 |

Primary Examiner—Thomas F. Callaghan
Attorney, Agent, or Firm—Vaden, Eickenroht, Thompson & Boulware

[57] ABSTRACT

A resilient seal ring for a tubular connection having an outside periphery that comes to a peak. The peak includes preferably two chamfered sides at respective angles to the axis of the ring that are greater than the adjacent conical surface angle. The crown of the peaked top is preferably flat. The connection includes a rectangular groove in a shallowly tapered conical surface of the pin member, preferably on a forward metal-to-metal sealing surface. The groove is slightly less deep than the seal ring.

4 Claims, 1 Drawing Sheet

PEAKED-TOP RESILIENT SEAL RING AND CONNECTION THEREWITH

BACKGROUND OF THE INVENTION

1. Field of the Invention

This invention pertains to resilient seal rings employed in tubular connections and the connections employing such seal rings.

2. Description of the Prior Art

High performance or premium tubular connections are normally designed not to leak and to retain both fluid and gas even under harsh operating conditions. Although the general configurations of the threads employed in such connections and the metallic conical surfaces adjacent the actual threads are often designed to provide suitable metal-to-metal seals that seal and do not leak, many thread connections also employ resilient seal rings in addition. In fact, in some cases, total seal reliance is placed in such a ring, not just secondary or tertiary sealing reliance.

However, the more normal condition encountered in practice is for the connection to have a metal-to-metal conical seal occurring at a given location, e.g., on the forward end of the pin member, with the resilient seal ring being included in a groove therein. In such a location, the ring contacts the opposing or mating sealing surface of the box member. The box member can be the adjacent tubular section with the box threads incorporated into the end thereof or the box member can be a coupling have box threads. In either case, the sealing action between the pin member and the box member is similar.

In addition to or instead of having a sealing surface at one or more conical surfaces adjacent the thread set or sets, as mentioned above, a connection can also seal in its threads. However, it is still often desirable to use a resilient seal ring even in such a connection. For example, a resilient seal ring can be included in the Series 500 Type 563 connection of the Hydril Company, which connection features a single step tapered dovetail wedge thread design having a shallow taper, mismatched angle, conical metal-to-metal seal. Although such a connection seals both in threads and on its adjacent conical surfaces, sealing is further enhanced with the inclusion of a sealing ring in a suitable groove included in the conical sealing surface forward of the thread set on the pin member.

The conventional seal ring employed in such a location is rectangular in cross-section and snugly fits into the groove made therefor. However, it is to be noted that the operating conditions for such a ring are often extremely harsh. The temperatures may be up to around 300° F. The pressures may be up to around 20,000 psi. There may be thermal cycling between a very hot condition and a relatively cooler one. There may be many break outs and make ups of the connection.

It has been observed that in testing of a resilient seal ring at the place noted, the rectangular cross-section seal ring normally employed in similar situations have sometimes resulted in leakage under such test conditions.

Therefore, it is a feature of the present invention to provide an improved resilient seal ring for sealing purposes in a tubular connection.

It is another feature of the present invention to provide an improved connection wherein a resilient sealing ring is an important part, the improvement including a more reliable seal at the ring than attained in the prior art.

SUMMARY OF THE INVENTION

A tubular connection comprises a pin member and a box member, the box member either being in the form of a box-type coupling or the box end of a tubular section. The connection may have a seal within the threads, have a seal at one or more of the conical surfaces adjacent the threads or have no metal-to-metal seal area at all. The area adjacent a thread set on the pin member, preferably in the area on the forward portion thereof, which may or may not be a metal-to-metal seal area, includes a rectangular groove therein for receiving a resilient seal ring. This pin area generally has a shallow taper, usually on the order of 14° or less. The seal ring has a base usually parallel to its axis and the two adjacent radial sides that are accommodated by the groove. The fourth side of the ring's cross-section comes to a peak, preferably at respective angles of about 15° with respect to each of the ring sides. The crown of the peak is preferably flat or parallel to the base of the ring. Also preferably, the sides of the ring are slightly longer than the respective adjacent sides of the groove in which the ring is located in use.

When the connection is made up, there is no sharp corner of the ring that comes into stabbing contact with the adjacent conical area of the box member. Therefore, there is no tendency for the ring to rub or crawl out of the groove. Moreover, when the connection is tightened, the forces on the ring are such that it is compressed generally into the groove to fill the area of the groove, rather than to be squeezed longitudinally to be between the pin area and box area adjacent the groove, as is sometimes the tendency with rectangularly shaped seal rings in the prior art.

The ring itself and the connection including the ring are two aspects of the present invention.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope as the invention may admit to other equally effective embodiments.

In the Drawings.

DESCRIPTION OF THE PREFERRED EMBODIMENT

Figure 1:
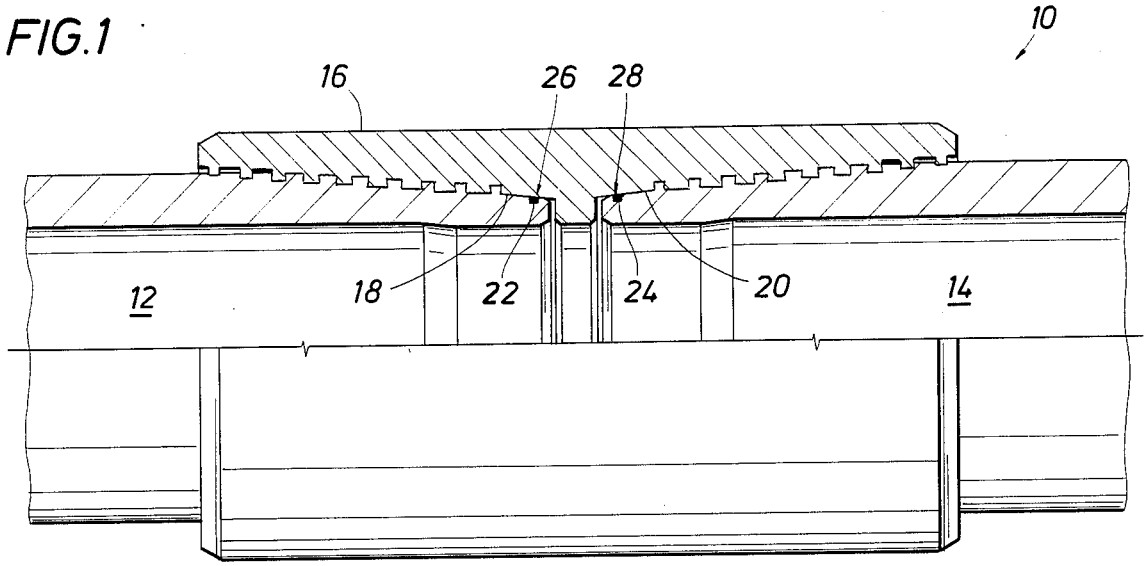
FIG. 1 is a longitudinal cross-section of a typical tubular connection employing a resilient seal ring in accordance with the present invention.

Now referring to the drawings and first to FIG. 1, a tubular connection 10 is shown that includes the ends of pin member 12 and pin member 14 joined together in the connection by coupling 16. Although the invention is illustrated in FIG. 1 in a coupled connection, it can also be employed in an integral connection. It will be seen that coupling 16 includes two box connections, one each for receiving the ends of pin member 12 and pin member 14. Also shown in the connection are threads which are of the wedge type. Such threads become increasingly smaller in the box member as the threads helically progress away from the end of the box member and progressively larger as they helically progress away from the end of the pin member. In such a connection sealing may be employed in the threads themselves, depending upon the dimensions of the threads, or on a conical sealing surface adjacent to the threads, or both. In the illustration shown, there is a conical, metal-to-metal seal at surfaces 18 with respect to pin member 12 and with respect to surface 20 with respect to pin member 14.

Located in the sealing surfaces of each of the conical members is a suitable rectangular groove 22 and 24, respectively, for accepting resilient seals 26 and 28, respectively, the configurations of the seal rings being described hereafter. The seal rings as well as the metal-to-metal sealing surfaces are independently designed to provide an effective pressure leakproof seal for the respective connections independently of any other seals which exist.

Figure 2:
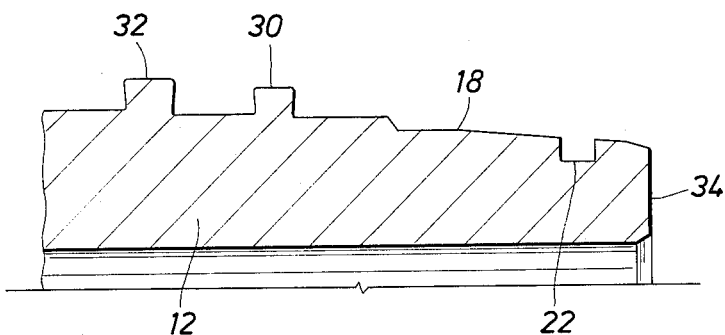
FIG. 2 is an enlargement of the longitudinal cross-section of the pin area employing a groove for receiving a resilient seal ring for use in a tubular connection in accordance with the present invention.

Referring now to FIG. 2, an enlargement of pin member 12 is shown with the first two threads 30 and 32 of the thread set near the forward end of the pin member. Adjacent the thread set on the forward end of the pin member is conical sealing surface 18. Groove 22, previously described, is rectangular in nature and is shown cut into area 18 near the forward part of the sealing surface. The connection including pin member 14 with its accommodating box member is similar to the connection In one nominal 2⅞ inch tubular section in the art, groove 22 is approximately 0.075 inches across and slightly under 0.025 inches deep. The rearward part of the groove is about 0.137 inches from the tip or nose end 34 of pin member 12. The base of the groove 22, the base being that portion of the groove which is parallel to the axis of the pin member, and each of the radial sides of the grooves, are nominally textured to 125 $R_a$. The corners at the intersection of each of the radial sides with the base side include a slight radius.

Figure 3:
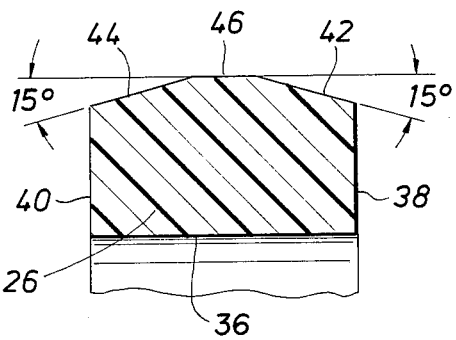
FIG. 3 is a cross-sectional view of a preferred resilient seal ring in accordance with the present invention.

Now referring to FIG. 3, a cross-sectional view of a resilient seal ring 26 is shown that is accommodated into groove 22 or 24. The base of the seal ring is approximately 0.010 inches less than the 0.075 inches dimension of the groove and the radial sides are approximately 0.025 inches. The ring is peaked on its fourth side to a dimension of about 0.006 inches. Chamfer sides 42 and 44 respectively angle from sides 38 and 40 and are each at an angle of about 15°. The crown at top surface 46 is preferably flat or parallel with base 36. This flat surface is only approximately 1/5th or so of the overall length of the side, however. Alternatively, the crown can be slightly rounded.

Figure 4:
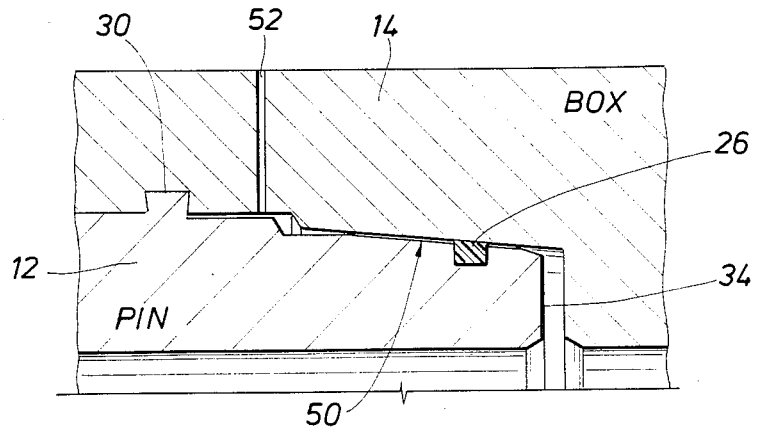
FIG. 4 is a cross-sectional view of a test connection employing a resilient seal ring in accordance with the present invention, the test connection being useful in testing the effectiveness of the seal ring, wherein the conical metal-to-metal seal and the thread seal are defeated.

FIG. 4 illustrates a test connection that was used in testing the efficacy of a groove and seal ring made in accordance with what has just been described. Pin member 12 is grooved on the side of groove 22 away from its tip or nose surface 34 to remove the metal-to-metal surface seal, as shown by area 50. This metal removal defeats the conical seal. In similar fashion, a port 52 is made into box member 14 just in front of the first thread 30 of the pin member. Hence, the only seal left in the connection is accomplished by resilient seal ring 26. A high, internal gas pressure of 19,600 psi and a net tension load of 208.6 kips was applied to the connection while the connection was thermally cycled between 100° F. and 300° F. At no time was a connection leak experienced using the seal mentioned.

The material for the resilient seal ring that was employed in the test and preferred for ring 26 is approximately 15% fiberglass filled PTFE (1/32" long fibers). Alternatively, other fiber-filled materials such as graphite filled PTFE can be employed. The corners of the ring seal were all broken at 0.005 inch maximum radius.

Although the above embodiment has been specifically described with respect to detailed dimensions, and the threads included in the connection were of the wedge thread-type variety, the invention is not limited thereto. Any tubular connection having a relatively shallow taper in the pin member can be enhanced and efficiently sealed by a seal ring of the general nature to that which has just been described. The specific dimensions would be in accordance with the size of the tubular member and groove size employed therein, which would be readily apparent to those skilled in the art.

The action of compression on the ring just described is such that the crown comes into contact with the opposing mating surface of the box member at an approximate angle which is somewhat equal to the taper of the box member. In such event, a sharp corner is not presented to the box member which would likely cause the ring to be pushed to caused to crawl out of the groove. Instead, the ring is pushed deeper within the groove. As it is pushed into the groove, the ring expands to the approximate dimension of the groove and upon final tightening seals effectively against the surface of the box member.

Although the radial sides of the ring are described as being preferably slightly longer than the radial sides of the groove, this is not necessary for a ring to function in the manner just described. That is, the sides of the ring and the sides of the groove can be approximately the same length, if desired. Moreover, the chamfer of sides 42 and 44 can be at a smaller or larger than 15° depending on the size of the seal ring and the taper of the related conical seal. The chamfer of the ring should be slightly greater than the conical sealing surfaces of the pin member and box member.

While a particular embodiment of the invention has been shown, it will be understood that the invention is not limited thereto. Many modifications may be made, which will become apparent to those skilled in the art.

What is claimed is:

1. A threaded tubular connection comprising a box having internal threads and a pin having external threads for mating with the internal threads of the box to make up the connection, said pin having a frusto-conical surface with a taper angle of about 8° or less between the end of the pin and the threads and said box having a frusto-conical surface with a taper angle slightly greater than the taper angle of the frusto-conical surface on the pin to engage the frusto-conical surface on the pin and form a metal-to-metal seal between the box and the pin when the connection is made up, said pin further having an annular groove in the frusto-conical surface, said groove being rectangular in cross section having parallel side walls and a bottom wall, a resilient seal ring located in the groove to be compressed between the box and the pin and to provide a seal there between when the connection is made up, said seal ring having side walls and a top portion that protrudes from the groove, said side walls being substantially the same width as the side walls of the groove so that the side wall of the seal ring facing the end of the pin will not engage the frusto-conical surface of the box as the pin moves axially into the box as the connection is made up, said protruding portion of the seal ring having an inclined surface extending from the top of the side wall of the seal member facing the end of the pin, said surface being inclined at an angle such that when it is engaged by the frusto-conical surface on the box the seal ring will be compressed into the groove and not sheared off as the pin moves further into the box as the connection is made up.

2. The connection of claim 1 in which the protruding top portion of the seal ring has inclined surfaces of about 15° extending from the top of both side walls so that the top portion will not be sheared from the ring regardless of which side wall of the ring is facing the end of the pin.

3. The connection of claim 1 in which the seal ring is made of fiber filed PTFE.

4. The connection of claim 1 in which the seal ring is made of approximately 15% fiberglass filled PTFE.

* * * * *